United States Patent [19]
Matsuguchi et al.

[11] Patent Number: 5,000,485
[45] Date of Patent: Mar. 19, 1991

[54] POSTCARD AND ITS MANUFACTURING METHOD

[75] Inventors: Noboru Matsuguchi; Tadashi Matsuguchi, both of Suita, Japan

[73] Assignee: Daimatsu Kagaku Kogyo Co., Ltd., Osaka, Japan

[21] Appl. No.: 246,238

[22] Filed: Sep. 16, 1988

[30] Foreign Application Priority Data

Sep. 18, 1987 [JP] Japan .................................. 63-231304
Sep. 18, 1987 [JP] Japan .................................. 62-235337
Sep. 18, 1987 [JP] Japan .................................. 62-235338
Sep. 18, 1987 [JP] Japan .................................. 62-235339

[51] Int. Cl.$^5$ .............................................. B42D 15/00
[52] U.S. Cl. .................................... 283/101; 283/105; 283/901; 283/903
[58] Field of Search ................ 283/101, 105, 901, 903

[56] References Cited
U.S. PATENT DOCUMENTS 3,854,229 12/1974 Morgan ........................... 283/101 P
3,891,242  6/1975 Arnold et al. ................... 283/901 X
3,900,219  8/1975 D'Amato et al. ............... 283/105 X
3,930,673  1/1976 Sanden ................................ 283/105
4,273,362  6/1981 Carrier et al. ................... 283/903 X
4,674,771  6/1987 Thompson, II .................. 283/901 X
4,872,707 10/1989 de Bruin .......................... 283/903 X Primary Examiner—Paul A. Bell
Attorney, Agent, or Firm—Jordan and Hamburg

[57] ABSTRACT

A postcard includes a postcard material and a label covering at least part of the postcard material, and the label in turn, includes a top material at least partly opaque, an inter-layer peel ply formed on the principal surface of the top material, and an adhesive layer formed on the principal surface of the inter-layer peel ply. With this postcard the top material of the label can be easily peeled off the postcard material in the part where the inter-layer peel ply is formed. Secret information shown on the principal surface of the postcard material is visible when the top material is peeled off the postcard material.

4 Claims, 5 Drawing Sheets

F I G. 8A
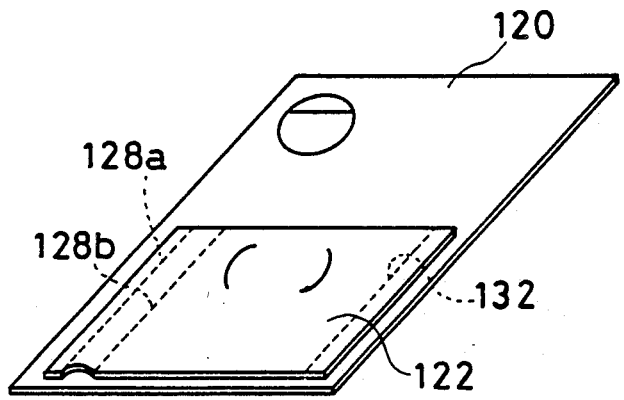
F I G. 8B
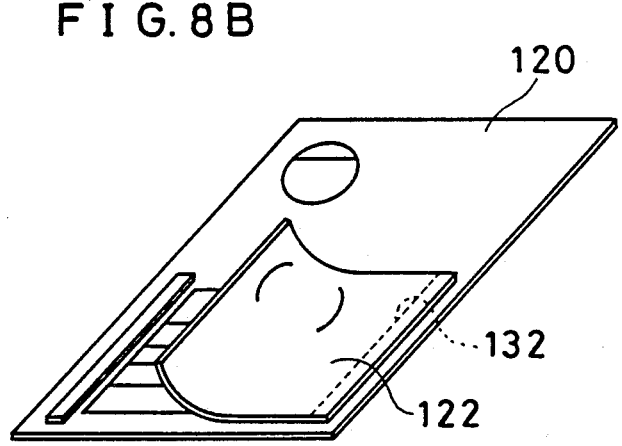
F I G. 9A
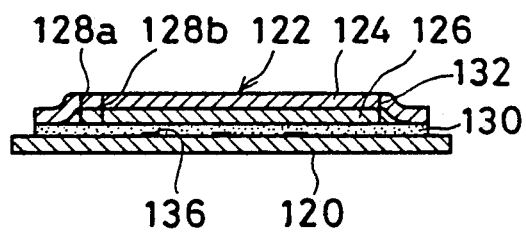
F I G. 9B
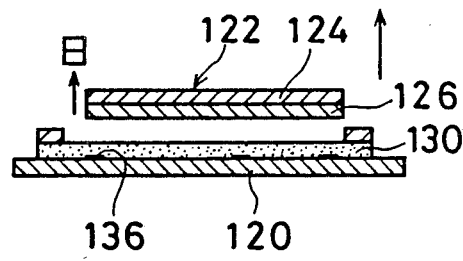

F I G. 10
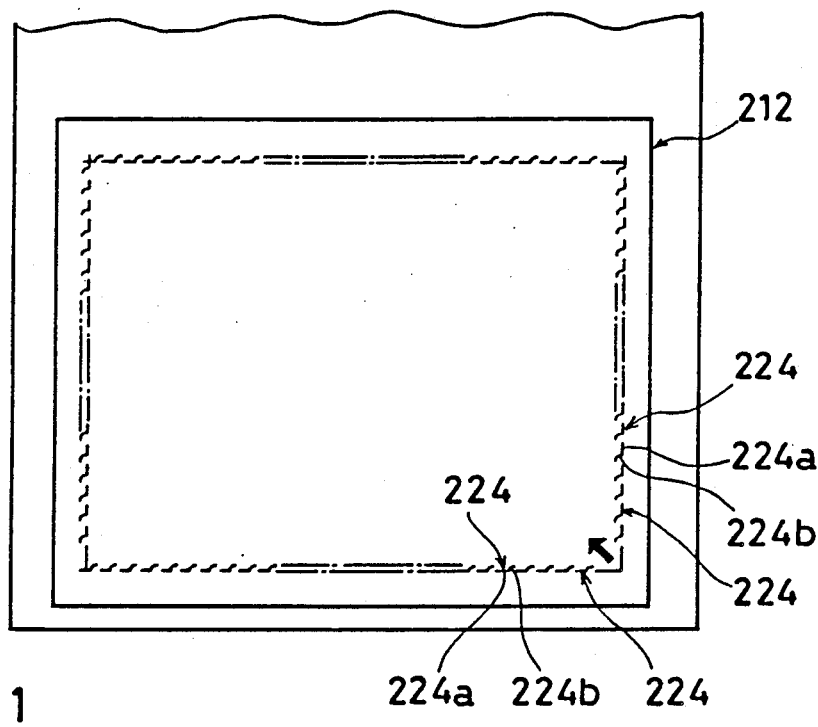
F I G. 11
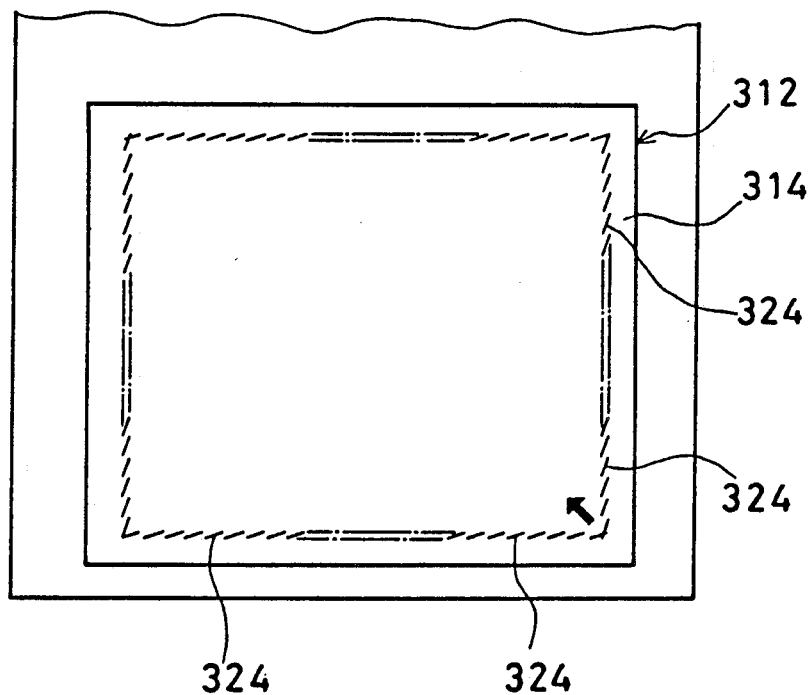

POSTCARD AND ITS MANUFACTURING METHOD

BACKGROUND OF THE INVENTION

1. Field of the Invention

The present invention relates to a special kind of postcard with a part thereof invisible, more particularly to a postcard wherein secret information is kept covered during mailing and the recipient can see it at his own discretion, and a method of manufacturing it.

2. Description of the Prior Art

Recently, mail containing secret information such as the balance of a person's bank deposit has been increasing. It has, therefore, been desired to develop a postcard, a part of which containing secret information is kept covered during mailing, but which the recipient can see without difficulty. Japanese Utility Model Publication No. 3789/'79, discloses a postcard, of which a part, for instance, a marked part is kept covered until it is uncovered by the recipient to see the secret information hidden thereunder.

To make it partly viewable, however, as seen from the text of the aforementioned Japanese Utility Model Publication No. 3789/'79, the entire surface of a covering paper has to be coated with a drying paste to form an adhesive film and the postcard material is partly, for instance, coated with a silicone release agent or the like so that the covering paper can be partly removed. Thus, since the covering paper has to be coated with a drying paste and the postcard material has to be partly treated with a release agent such as one based on silicone, the construction of such a postcard becomes inevitably complicated and the increased number of manufacturing steps results in an increased manufacturing cost.

SUMMARY OF THE INVENTION

Therefore, it is a principal object of the present invention to provide a postcard, in which surface treatment of the postcard material is not required.

A first embodiment relates to a postcard composed of a postcard material and a label comprising a top material at least partly opaque, an inter-layer peel ply formed on the principal surface of the top material, and an adhesive layer formed on the principal surface of the inter-layer peel ply.

A second embodiment relates to a method of manufacturing such postcard consisting of a step of printing or coating picture lines on a postcard material, a process of manufacturing a label comprising steps (A) to (C), namely (A) a step of preparing a top material at least partly opaque, (B) a step of forming an inter-layer peel ply by printing or coating a release agent on the principal surface of the top material and (C) a step of forming an adhesive layer on the surface of the inter-layer peel ply, and a step of sticking the label with its adhesive layer side to the picture lines part of the postcard material.

According to the present invention, the label has the inter-layer peel ply between the opaque top material and the adhesive layer and the aforementioned adhesive layer is stuck to the postcard material, and the top material of the label can be peeled off with relative ease as it is stuck relatively weakly to the adhesive layer where the inter-layer peel ply is formed.

According to the present invention, the adhesive layer is stuck to the postcard material relatively strongly, while the top material of the label is stuck to the adhesive layer by means of the inter-layer peel ply and is stuck to the postcard material still weaker, hence the top material of the label can be peeled off the postcard material with relative ease. After the top material of the label has been peeled off the postcard material, the secret information on the principal surface of the postcard material can be seen through the transparent part of the adhesive layer.

Moreover, by sticking the label without processing the postcard material, a postcard which includes the top material stuck weakly on the postcard material can be obtained, and the user is required only to do a simple peeling operation, thus making this type of postcard widely applicable.

The aforementioned objects and other objects, features and advantages of the present invention will become more apparent from reading of the detailed description of the embodiments given below with reference to the accompanying drawings.

BRIEF DESCRIPTION OF THE DRAWINGS

FIG. 4 and FIG. 5 are views showing a variation of the aforementioned embodiment, of which FIG. 4 is a sectional view and FIG. 5 is a partly broken-out perspective view.

FIG. 8A and FIG. 8B are perspective views showing another embodiment, and FIG. 9A and FIG. 9B are sectional views of the embodiment illustrated in FIG. 8A.

FIG. 10 is a partial plan view showing a separate embodiment of the invention.

FIG. 11 is a partial plan view showing a modification of the embodiment of FIG. 10.

DESCRIPTION OF THE PREFERRED EMBODIMENTS

Figure 1A:
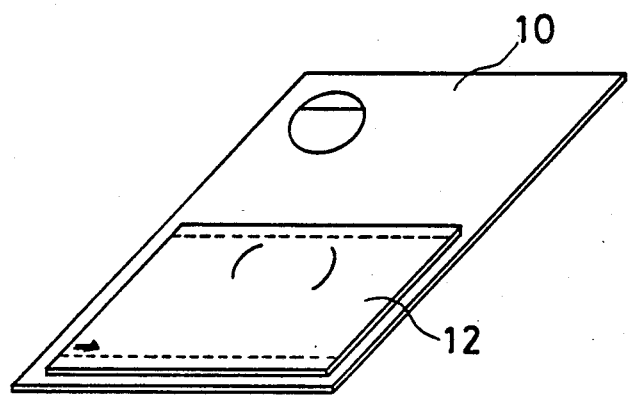
FIG. 1A and FIG. 1B are perspective views showing an embodiment of the present invention.
Figure 1B:
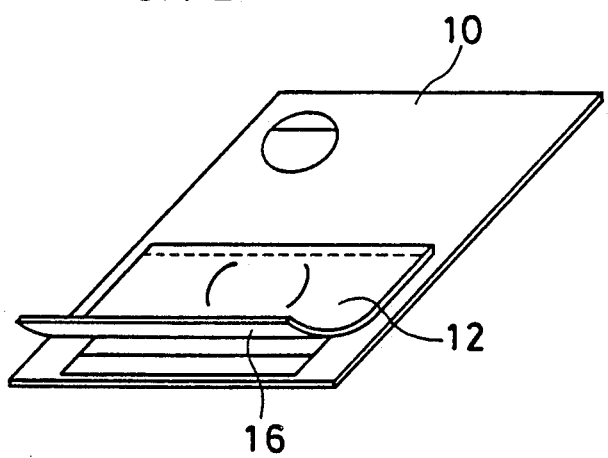

FIG. 1A and FIG. 1B are perspective views showing a postcard embodying the present invention.

Figure 2A:
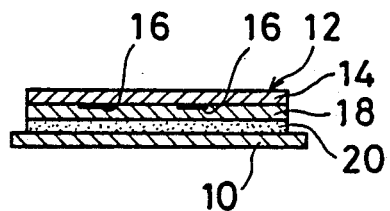
FIG. 2A and FIG. 2B are sectional views showing the above embodiment.
Figure 2B:
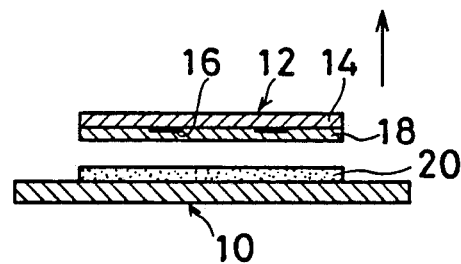

FIG. 2A and FIG. 2B are sectional views of the aforementioned embodiment.

This postcard includes a postcard material 10 of postcard size and a label 12 stuck to a part of postcard material 10.

This label 12 includes a top material 14 formed of an opaque material.

This top material 14 is formed of a relatively soft material such as paper or a synthetic resin film.

This top material 14 is required to be opaque and have a suppressiveness which suppresses adhesion, i.e., it resists adhesion. The top material 14 has to be made capable of covering by making it opaque by, for instance, printing it with a silver ink or the like to thereby form a suppression layer.

The surface of the suppression layer has formed therein a lottery part 16 wherein are shown letters such as "WINNING" or "BLANK".

The principal surface of the lottery part 16 of the aforementioned top material 14 is printed or coated with a wax to form an inter-layer peel ply 18, a part of which is made transparent so that the lottery part 16 can be seen therethrough.

As the wax forming this inter-layer peel ply 18 may be used any of the animal, vegetable, mineral and petroleum-derived waxes, for instance, natural waxes such as paraffin wax, microcrystalline wax or petrolatum wax. Also usable are, among others, Fischer tropush wax and its derivatives, synthetic hydrocarbons such as low-molecular polyethylene and its derivatives, modified waxes such as montan wax derivatives, paraffin wax derivatives and microcrystalline wax derivatives, aliphatic alcohols and acids such as cetyl alcohol and stearic acid, fatty acid esters such as glyceryl stearate and polyethylene glycol stearate, hydrogenated waxes such as glyceride, castor wax and opal wax, synthetic ketone amine amides such as armor wax and acra wax and, further, chlorinated hydrocarbons, synthetic animal waxes, and synthetic waxes such as alpha-olefin wax. It is also possible to use mixed waxes containing any of the aforementioned waxes.

On one principal surface of the inter-layer peel ply 18, an adhesive layer 20 is formed by printing or coating an adhesive of the pressure sensitive type.

The lottery part 16 may be formed either on the surface of the aforementioned inter-layer peel ply 18 or on the surface of the postcard material 10 to be visible through the adhesive layer 20. However, in such a case, the adhesive layer 20 has to be made transparent or translucent. The lottery part 16 may also be formed on the surface of the inter-layer peel ply 18, and in this case the inter-layer peel ply 18 need not be transparent or translucent.

Now, the method of manufacturing a postcard of this kind will be described.

Figure 3:
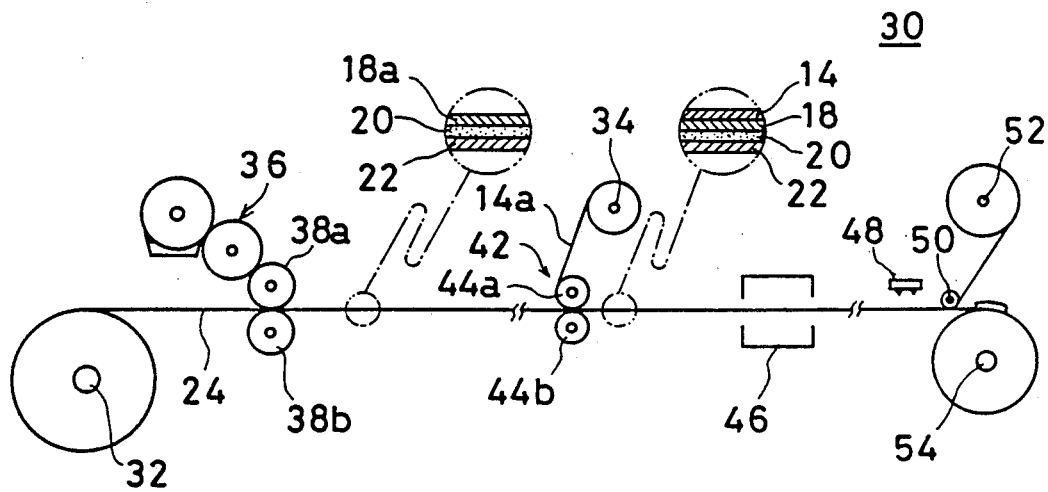
FIG. 3 is an illustrative view showing an example of the method of manufacturing the embodiment shown in FIG. 1.

First to be described is the method of manufacturing the label, referring mainly to FIG. 3.

To be prepared first is a piece of paper as the top material 14 and, if the suppressiveness of the paper is insufficient, either the principal surface thereof is solid-printed with a silver ink by a known printing method such as offset printing or by coating to thereby form a suppression layer. Alternatively, for formation of this suppression layer, an aluminum foil may be stuck to the principal surface of the paper using, for instance, an adhesive of the pressure-sensitive type and this paper-aluminum foil laminate may be used as top material 14. On the surface of this suppression layer the lottery part 16 is formed by printing or coating.

Meanwhile, a laminate 24 is prepared by application of an adhesive of the pressure sensitive type on the principal surface of a release sheet 22 coated with a release agent.

To the principal surface of this adhesive layer 20, the aforementioned release sheet 22 which plays a role of continuously supporting the label 12 divided into a plurality of parts, at the same time covering and protecting the adhesive layer 20, is temporarily stuck so that by the action of the release agent layer formed on the principal surface of the release sheet 22, the adhesive layer 20 can be easily peeled off the release sheet 22.

This laminate 24 in a rolled form is mounted on a holding roller 32 of a manufacturing equipment 30 for the label. Meanwhile, the top material 14, also in a rolled form, is mounted on a holding roller 34 of the same equipment 30.

Then, one end of the rolled-up laminate 24 is pulled out and led into coating apparatus 36.

This coating apparatus 36 is for coating the surface of the adhesive layer 20 with an inter-layer release agent such as wax agent 18a for formation of the inter-layer peel ply thereon, comprising two rollers 38a and 38b and also a storage vessel 40, and serves to apply by coating the heated and molten inter-layer release agent 1a with the rollers 38a and 38b being revolved.

As this coating apparatus 36, a coating machine such as a gravure roll coater or reverse roll coater may be used as well as a well-known printing machine such as an offset printing machine or screen printing machine.

Thus, the laminate 24 coated with the inter-layer release agent 18a is led into a laminating machine 42 for further lamination with the top material 14 as shown in FIG. 3.

The laminating machine 42 laminates paper 14a to serve as the top material 14 on the surface of the inter-layer release agent 18a on the laminate 24, is arranged on the path for the laminate 24, and includes a holding roller 34 for holding the top material 14 in roll form.

This paper 14a has one end pulled out and this is introduced between the roller 44a and the opposing roller 44b. Then, the laminate 24 coated with the inter-layer release agent 18a is led between the rollers 44a and 44b, hence between these rollers 44a and 44b the paper 14a is laid on the laminate 24 with the inter-layer release agent 18a in between. Thus, the laminate 24 with the paper 14a to serve as the top material 14 laid thereon is led through a cooler 46 or cooling roller (not shown).

The cooler 46 is for cooling the inter-layer release agent 18a applied between the laminate 24 and the paper 14a.

In the cooler 46, the inter-layer release agent 18a sandwiched between the laminate 24 and the paper 14a is cooled and solidified to form the inter-layer peel ply 18.

As mentioned above, the laminate further laminated with the top material with the inter-layer peel ply 18 in between is led through a stamping unit 48. The stamping unit 48 includes a so-called die cutter, and by this die cutter proper cuts are made in the top material 14, inter-layer peel ply 18, and adhesive layer 20. The stamping unit 48 may as well be of the type having an edged roll, the so-called die roll.

The laminate 24 further laminated with the top material 14, etc., with cuts made therein is divided as it passes over a roller 50 between necessary and unnecessary parts and the unnecessary parts are wound round a waste take-up roller 52, while the label 12 temporarily stuck to the release sheet 22 is wound round a take-up roller 54.

Instead of the stamping unit 48 and the take-up roller 54, a cut-making unit may as well be used. This cut-making unit includes a cutting blade for making cuts in the top material 14, inter-layer peel ply 18 and adhesive layer 20 so as to divide the label 12 into a plurality of parts.

Then, the label 12 in roll form is unrolled to pass through a label sticking unit in which it is stuck to the postcard material 10. The postcard material may then be precut to official postcard size or the form of a continuous strip perforated properly. The secret information in letters or the like to be concealed by this label 12, such as the balance of a person's bank deposit, is pre-printed, for example, near the bottom of its surface.

For sticking the label 12 to the postcard, for example, near its bottom, first the postcard material 10 is sent in successively. And, the rolled-up label 12 is unrolled to be led to a release plate. By the use of the release plate, the label 12 and release sheet 22 are separated. The label 12 is stuck on the surface of the postcard material 10 by pressing the surface of the postcard material 10 after laying the label 12 on top of the postcard material 10.

When the postcard material 10 and the label 12 are pressed together, the label 12 is stuck strongly to the postcard material 10 by means of the adhesive layer 20, while the top material 14 is stuck weakly because of the presence of the inter-layer peel ply 18. Hence, as shown in FIG. 1B and 2B, the top material 14 of the label 12 can be peeled off the postcard material 1 with relative ease.

As examples of the top material 14 of the label 12 there can be cited, besides the one shown in the afore-mentioned embodiment, synthetic paper, films of cellophane, polyethylene, polyester and the like, or an aluminum foil, etc., but it is advisable to choose one relatively soft lest this label 12 stuck to the postcard material 10 should accidentally come off the postcard material 10 against the adhesion of the inter-layer peel ply 18.

When as the top material 14 what is excellent in suppressiveness such as aluminum foil has been selected, formation of a suppression layer such as in the aforementioned embodiment may be dispensed with.

Although in the aforementioned embodiment continuous paper in roll form was selected as the top material 14, it may as well be separated in sheet form.

The surface of the top material 14 may be printed in a mode suited for the postcard material 10, and when the top material 14 and inter-layer peel ply 18 are formed to be continuous, marks for checking the feeding pitch of the label 12 such as black arrows may be printed as shown in FIG. 1A.

Figure 4:
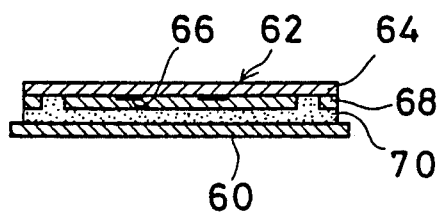

FIG. 4 is a view showing a postcard as a variation of the aforementioned embodiment.

As shown in FIG. 4, this postcard includes a postcard material 60 and a label 62 stuck to the surface of the postcard material 60, and the label 62 includes a top material 64, lottery part 66, inter-layer peel ply 68, and adhesive layer 70.

Figure 5:
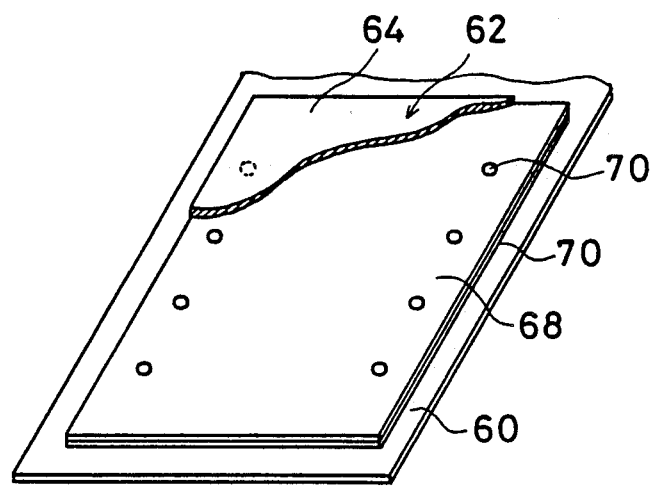

In this label 62, a part of the adhesive layer 70 is stuck directly to the top material 64, as shown in FIG. 5.

Hence, where the inter-layer peel ply 68 is not formed, the top material 64 is stuck to the adhesive layer 70 relatively strongly so that there is little risk of the top material 64 being accidentally peeled off the postcard material 60 even where the inter-layer peel ply 68 is present.

Now, described below is the method of manufacturing the label 62 illustrated in FIG. 4, referring mainly to FIG. 6 and FIG. 7.

Figure 6:
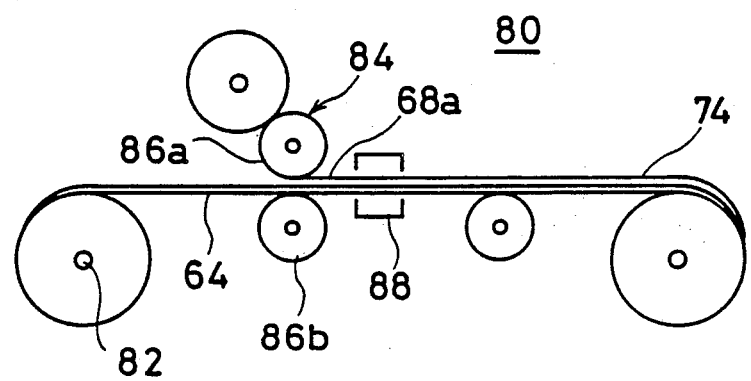
FIG. 6 and FIG. 7 are illustrative views showing an example of the manufacturing method for the embodiment shown in FIG. 4.

FIG. 6 is an illustrative view showing an example of manufacturing equipment for a laminate 74 formed by laminating the top material 64 and inter-layer peel ply 68.

The illustrated manufacturing equipment 80 for this laminate 74 includes a holding roller 82 for holding the strip-like top material 64 in roll form. The top material 64 held by the holding roller 82 has one end thereof pulled out and this end is led into an inter-layer release agent coating unit 84.

This inter-layer release agent coating unit 84 is for printing or coating the surface of the top material 64 with an inter-layer release agent 68a such as wax, and includes two rollers 86a and 86b.

The inter-layer release agent 68a is applied to the roller 86a. Hence, when the rollers 86a and 86b are revolved, the surface of the top material 64 being led therebetween is printed or coated with the inter-layer release agent 68a except for spots.

As the inter-layer release agent coating unit 84, a coating machine of some other type or a known printing machine such as an offset printing machine or a screen printing machine may be used as well.

The top material 64 printed or coated with this inter-layer release agent 68a is then led through a drying unit 88 for solidification of the inter-layer release agent 68a.

The laminate 74 with the inter-layer release agent 68a solidified on its surface in the drying unit 88 is properly wound up in roll form after solidification of the inter-layer release agent 68a.

Figure 7:
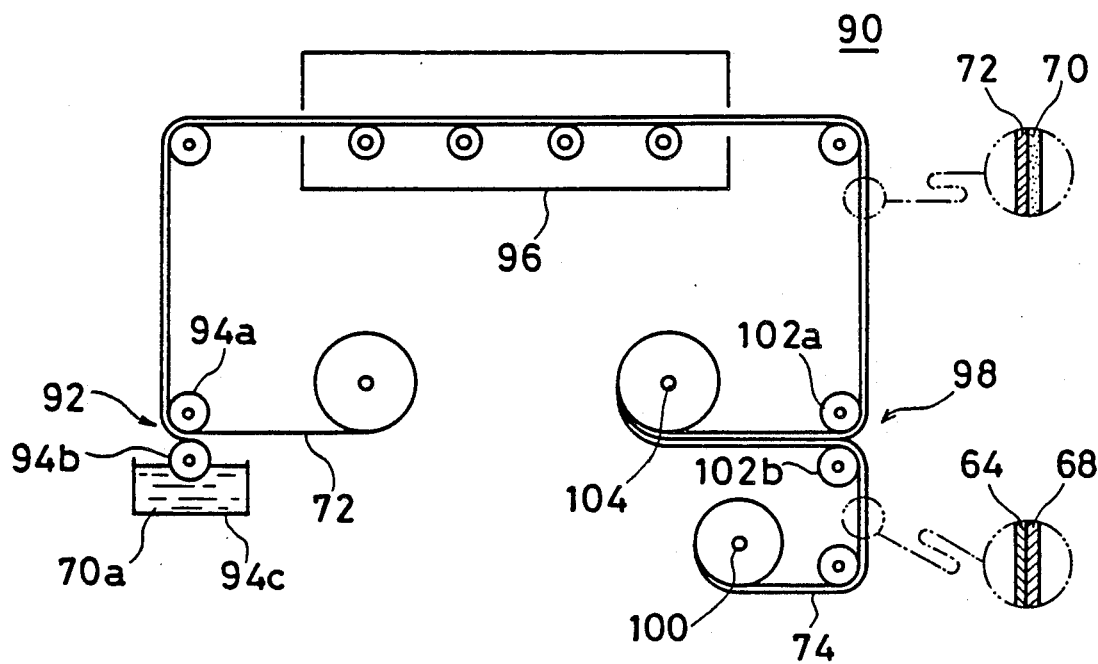

The laminate 74 wound up in roll form as shown in FIG. 7 is then loaded in a laminating unit 90 for formation of an adhesive layer 70.

In this laminating unit 90, a release sheet 72 is loaded in roll form, and one end thereof is pulled out and is led into an adhesive coating unit 92 for having the surface of the release sheet 72 printed or coated with an adhesive 70a such as an adhesive of the pressure sensitive type.

The adhesive coating unit 92 includes two rollers 94a and 94b.

The roller 94b has its lower part kept dipped in the adhesive 70a in the bottom portion of a pan 94c. Hence, when the rollers 94a and 94b are revolved, the surface of the release sheet 72 is printed or coated with the adhesive 70a. As this adhesive coating unit 92, a coating machine of some other type or a printing machine of a known type such as an offset printing machine or a screen printing machine may be used as well.

The release sheet 72 thus printed or coated with the adhesive 70a is then led through a drying unit 96 including, for example, a heater. In the drying unit 96, the adhesive 70a applied to the surface of the release sheet 72 by printing or coating is dried to form the adhesive layer 70. The release sheet 72 with the adhesive layer 70 formed thereon is led into a laminating unit 98.

Meanwhile, the aforementioned laminate 74 is held in roll form on a separate holding roller 100, one end thereof is pulled out and this end is led into the laminating unit 98. The laminating unit 98 includes two rollers 102a and 102b. Between these two rollers 102a and 102b, the laminate of the release sheet 72 and the adhesive layer 70 is passed through together with the laminate 74 so that the inter-layer peel ply 68 of the laminate 74 is stuck to and laminated on the adhesive layer 70. When these rollers 102a and 102b are revolved, the laminate of the adhesive layer 70, etc., and the inter-layer peel ply 68 of the laminate 74 passing therethrough are stuck together and the label 62 is formed thereby.

The formed label 62 is wound round a take-up roller 104 to be kept in roll form.

When this is to be used, the roll may be unrolled and stamped in the desired shape as described above.

FIG. 8A and FIG. 8B are perspective views showing another embodiment, and FIG. 9A and FIG. 9B are sectional views of the embodiment shown in FIG. 8A.

FIG. 8A and FIG. 9A are views showing the original state, and FIG. 8B and FIG. 9B are views showing the released state.

In this embodiment, cuts 128a and 128b are made in a label 122 stuck to the postcard material 120, where the inter-layer peel ply 126 is formed, continuously from one end to the other end in parallel and in relative proximity in the vicinity of the left end of a top material 124 so as to allow parting of the top material 124. Moreover, the top material 124 between the cuts 128a and 128b is formed sunken to be easily caught by a finger or nail so that the top material 124 between the cuts 128a and 128b can be parted with ease. Alternatively, a projection may be provided at the fore end of the top material 124 between the cuts 128a and 128b to facilitate picking instead of the aforementioned sinking.

Also, in the vicinity of the right edge, a cut 132 for parting is provided so that the label 122 peeled off the postcard material 120 can be parted from the part securely stuck by means of the adhesive layer 130. In this embodiment a lottery part 136 is provided on the postcard material side 120 to be visible through the adhesive layer 130.

These cuts 128a and 128b as well as the cut 132 for parting are formed, when the top material 124 is made of paper, along the fiber direction so that the top material 124 can be parted with relative ease. By the way, in this embodiment, the adhesive layer 130 is directly stuck in the vicinities of both edges of the top material 124 lest it should be peeled off accidentally.

In each embodiment the cuts may be formed along all edges of the top material. When the cuts are formed like that, the center portion of the label is peeled off easily. In this case, as shown in FIG. 10, when each cut is constituted with a linear cut portion and a curvilinear cut portion, respectively, so as to overlap a part of one cut 224 and a part of the next cut 224 in a direction for peeling the label 212, the center portion of the label 212 can be peeled off easily. In addition, for peeling off the center portion of the label easily, as shown in FIG. 11, for example, each linear cut 324 may be formed along edges of the top material 314 on a slant so as to overlap a part of one cut 324 and part of the next cut 324 in a direction for peeling off the label 312.

It is to be understood that the embodiments described and illustrated above are solely for the purpose of explanation and are by no means limitative. The spirit and scope of the present invention is limited only by the appended claims.

What is claimed is:

1. A postcard comprising a top material which is at least partially opaque, an inter-layer peel ply adhered to said top material, a postcard material, indicia means on one side of said postcard material, an adhesive layer which is at least partially transparent adhered to said postcard material with said adhesive layer being in contact with said one side of said postcard material having said indicia means, said inter-layer peel ply comprising wax and being adhered to said adhesive layer with an adhering strength which is less than the adhering strength between said inter-layer peel ply and said top material, and less than the adhering strength between said adhesive layer and said postcard material, said top material and inter-layer peel ply being peelable off of said adhesive layer as separation occurs between said inter-layer peel ply and said adhesive layer, said indicia means on said postcard material being viewable through said transparent adhesive layer after said opaque top material and said inter-layer peel ply have been peeled off of said adhesive layer.

2. A postcard comprising a top material which is at least partly opaque, and inter-layer peel ply adhered to said top material, said inter-layer peel ply having a plurality of openings, a postcard material, and an adhesive layer which is at least partly transparent adhered to said postcard material, said adhesive layer having spaced projections extending into said openings and adhered to said top material, said inter-layer peel ply being adhered to said adhesive layer with an adhering strength which is less than the adhering strength between said inter-layer peel ply and said top material, and less than the adhering strength between said adhesive layer and said postcard material, said projections on said adhesive layer adhering to said top material with an adhering strength greater than the adhering strength between said inter-layer peel ply and said top material, said top material and said inter-peel ply being peelable off of said adhesive layer as separation occurs between said inter-layer peel ply and said adhesive layer with said adherence between said projections and said top material providing an additional adherence to preclude inadvertent and unintended removal of said top material from said postcard material.

3. A postcard according to claim 2, wherein said adhesive layer is adhered to one side of said postcard material, and further comprising indicia means on said one side of said postcard material, said indicia means on said postcard material being viewable through said transparent adhesive layer after said opaque top material and said inter-layer peel ply have been peeled off of said adhesive layer.

4. A postcard according to claim 2, wherein said inter-layer peel ply comprises wax.

* * * * *